(12) United States Patent
Ling et al.

(10) Patent No.: US 11,505,247 B2
(45) Date of Patent: Nov. 22, 2022

(54) SYSTEM AND METHOD FOR TRAILER HEIGHT ADJUSTMENT

(71) Applicant: Ford Global Technologies, LLC, Dearborn, MI (US)

(72) Inventors: Yu Ling, Canton, MI (US); Chen Zhang, San Jose, CA (US); Luke Niewiadomski, Hamtramck, MI (US); Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/141,588

(22) Filed: Jan. 5, 2021

(65) Prior Publication Data

US 2021/0122416 A1   Apr. 29, 2021

Related U.S. Application Data

(62) Division of application No. 16/051,553, filed on Aug. 1, 2018, now Pat. No. 10,913,494.

(51) Int. Cl.
| | | |
|---|---|---|
| *B60K 35/00* | (2006.01) | |
| *B62D 15/02* | (2006.01) | |
| *B60R 11/04* | (2006.01) | |
| *B60D 1/06* | (2006.01) | |

(52) U.S. Cl.
CPC ............ *B62D 15/025* (2013.01); *B60D 1/06* (2013.01); *B60K 35/00* (2013.01); *B60R 11/04* (2013.01); *B60K 2370/11* (2019.05); *B60K 2370/1438* (2019.05); *B60K 2370/152* (2019.05); *B60K 2370/21* (2019.05)

(58) Field of Classification Search
None
See application file for complete search history.

(56) References Cited

U.S. PATENT DOCUMENTS

| | | | |
|---|---|---|---|
| 9,102,271 B2 | 8/2015 | Trombley et al. | |
| 9,296,422 B2 | 3/2016 | Lavoie | |
| 9,499,018 B2 | 11/2016 | Gehrke et al. | |
| 10,266,023 B2 | 4/2019 | Mattern et al. | |
| 2014/0267688 A1 | 9/2014 | Aich et al. | |
| 2014/0309888 A1 | 10/2014 | Smit et al. | |
| 2015/0115571 A1 | 4/2015 | Zhang et al. | |
| 2016/0039456 A1* | 2/2016 | Lavoie | B60D 1/245 |
| | | | 701/41 |
| 2016/0052548 A1* | 2/2016 | Singh | B62D 15/028 |
| | | | 701/41 |

(Continued)

FOREIGN PATENT DOCUMENTS

EP   2682329 A1   1/2014

*Primary Examiner* — James M McPherson
(74) *Attorney, Agent, or Firm* — Gregory Brown; Price Heneveld LLP

(57) ABSTRACT

A method for identifying a trailer connection for a vehicle includes storing a plurality of connection configurations as saved configurations. The connection configurations identify a hitch compatibility of a coupler of a trailer to a hitch assembly. The method further comprises capturing image data depicting the hitch assembly and processing the image data. Based on the processing of the image data, the method further identifies a detected hitch configuration of the hitch assembly as a first hitch configuration of the saved configurations.

16 Claims, 9 Drawing Sheets

(56) References Cited

U.S. PATENT DOCUMENTS

| | | |
|---|---|---|
| 2016/0272024 A1 | 9/2016 | Bochenek et al. |
| 2018/0081370 A1* | 3/2018 | Miller .................. G05D 1/0246 |
| 2018/0208241 A1 | 7/2018 | Shepard |
| 2018/0312112 A1* | 11/2018 | Lewis .................... G06V 20/56 |
| 2019/0172218 A1 | 6/2019 | Maruoka et al. |
| 2019/0299861 A1* | 10/2019 | Weigert ............... H04N 5/2252 |
| 2019/0346858 A1 | 11/2019 | Berkemeier et al. |

* cited by examiner

SYSTEM AND METHOD FOR TRAILER HEIGHT ADJUSTMENT

CROSS-REFERENCE TO RELATED APPLICATIONS

This application is a divisional application of U.S. application Ser. No. 16/051,553 entitled SYSTEM AND METHOD FOR TRAILER HEIGHT ADJUSTMENT, filed on Aug. 1, 2018, by Yu Ling, et al., now U.S. Pat. No. 10,913,494, the entire disclosure of which is incorporated herein by reference.

FIELD OF THE DISCLOSURE

The present disclosure generally relates to a system for assisting in a vehicle-trailer hitching operation. In particular, the present system relates to a system and method configured to program or detect a coupling interface for a vehicle-trailer combination.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a method for identifying a trailer connection for a vehicle is disclosed. The method includes storing a plurality of connection configurations as saved configurations. The connection configurations identify a hitch compatibility of a coupler of a trailer to a hitch assembly. The method further comprises capturing image data depicting the hitch assembly and processing the image data. Based on the processing of the image data, the method further identifies a detected hitch configuration of the hitch assembly as a first hitch configuration of the saved configurations.

Various aspects of the invention can include any one or a combination of the following features or steps:

receiving a confirmation of the first hitch configuration via a user interface;
controlling an automated navigation operation of the vehicle based on the first hitch configuration of the hitch assembly in response to the confirmation;
displaying the first hitch configuration on the display identifying the detected hitch configuration;
identifying a location of a coupler of a trailer in second image data; and controlling a navigation of the vehicle based on the first hitch configuration of the hitch assembly and the location of the coupler;
the saved configurations comprise at least one of a hitch ball diameter of a hitch ball of the hitch assembly and a position of the hitch ball relative to the vehicle;
processing a path derivation routine identifying a navigation path of the vehicle aligning the hitch ball with the coupler based on the position of the hitch ball;
capturing second image data depicting the trailer; and processing the second image data and identifying a detected coupler configuration of the coupler of the trailer as a second configuration of the saved configurations;
the coupler configuration comprises a connection diameter of the coupler; and/or
comparing the first configuration of the hitch assembly to the second configuration of the coupler; and identifying a compatibility of the coupler to the hitch assembly based on the comparison.

According to another aspect of the present disclosure, a vehicle system is disclosed. The system comprises a hitch assembly mounted on a vehicle. An imaging system is configured to capture image data comprising the hitch assembly. The system further comprises a user interface comprising a display and a controller that identifies the hitch assembly based on the image data and accesses a hitch configuration of the hitch assembly in response to the detection. The controller further displays the hitch configuration on the display, receives a selection of the hitch configuration, and controls an automated navigation operation of the vehicle based on the configuration for the hitch assembly.

Various aspects of the invention can include any one or a combination of the following features or steps:

the selection of the hitch configuration is a confirmation that the detected hitch assembly is accurately identified;
the controller further identifies a coupler of a trailer based on the image data;
the controller further accesses a coupler configuration of the trailer in response to the identification of the trailer;
the controller further displays the coupler configuration on the display; and receives a selection of the coupler configuration;
the selection of the coupler configuration is a confirmation that the detected coupler is accurately identified;
the controller further determines a connection compatibility between the hitch assembly and the coupler based on the hitch configuration and the coupler configuration;
the controller further in response a positive determination of the connection compatibility, controls the automated navigation operation; and/or
the controller further in response a negative determination of the connection compatibility, outputs an instruction to adjust at least one of the hitch configuration and the coupler configuration.

According to yet another aspect of the present disclosure, a method for identifying a trailer connection for a vehicle is disclosed. The method includes storing a plurality of connection configurations as saved configurations. The connection configurations identify a hitch compatibility of a coupler of a trailer to a hitch assembly. The method further comprises capturing first image data of the hitch assembly, processing the first image data, and identifying a detected hitch configuration of the hitch assembly as a first hitch configuration of the saved configurations. The method further comprises capturing second image data of the trailer, processing the second image data, and identifying a detected trailer configuration of a coupler of the trailer as a second configuration of the saved configurations. The method further compares the first configuration of the hitch assembly to the second configuration of the coupler and identifies a compatibility of the coupler to the hitch assembly based on the comparison.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
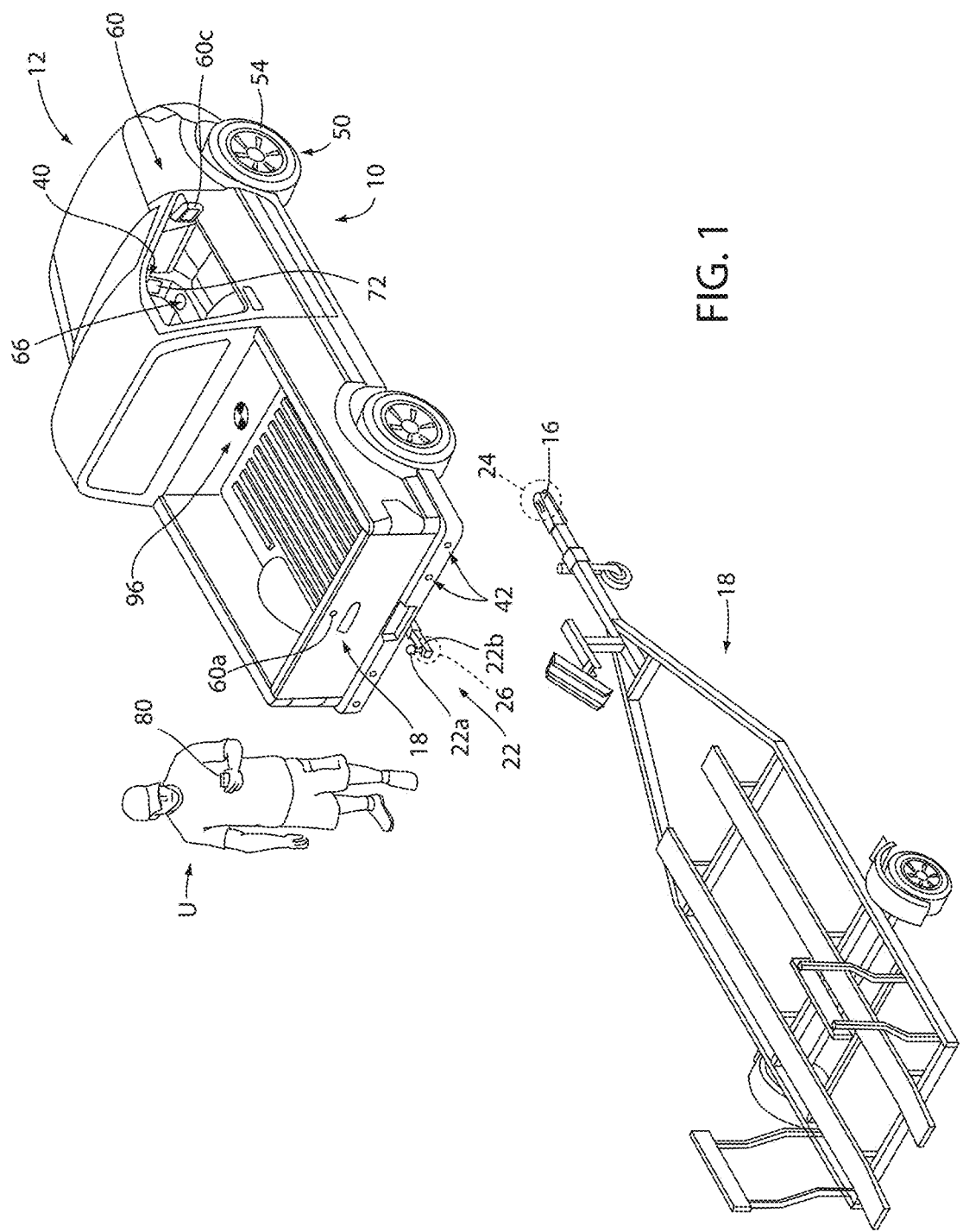
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-9, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22a of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the hitch assist system 10 may be configured to detect and/or store a configuration of the hitch ball 22a in connection with the vehicle 12. For example, as discussed further in reference to FIGS. 5-9, the connection of the vehicle 12 to the trailer 18 may require a specific size for the hitch ball 22a. Additionally, each hitch ball 22a may be connected to the vehicle 12 via a hitch adapter 22b or ball mount. The hitch adapter 22b and the hitch ball 22a may correspond to a hitch assembly 22. The hitch assembly 22 may connect the hitch ball 22a to the vehicle in a variety of configurations. In operation, the user U of the system 10 may select the hitch ball 22a and the hitch adapter 22b via the HMI 66. Each of the combinations of the hitch ball 22a and the hitch adapter 22b may result in variation in the hitch position 26 and/or the height $H_b$ of the hitch ball 22a. A first configuration 30a and a second configuration 30b of the hitch assembly 22 are demonstrated in FIGS. 6A and 6B, respectively.

As is discussed further in reference to various embodiments, the hitch assist system 10 may be configured to detect a height $H_c$ of the coupler 16 and control the navigation of the vehicle 12 along the vehicle path 20. During the control of the vehicle 12, the hitch assist system 10 may identify whether the hitch ball 22a is compatible with the coupler 16. Additionally, the hitch assist system 10 may determine whether the height $H_b$ of the hitch ball 22a is compatible with (e.g., below or less than) the height $H_c$ of the coupler 16. In an exemplary embodiment, the controller 14 of the hitch assist system 10 may be configured to detect and/or store the dimensions and the compatibility of each of a plurality of hitch assemblies 22 to a variety of trailers in order to improve an ease of use and accuracy of the hitch assist system 10.

Figure 2:
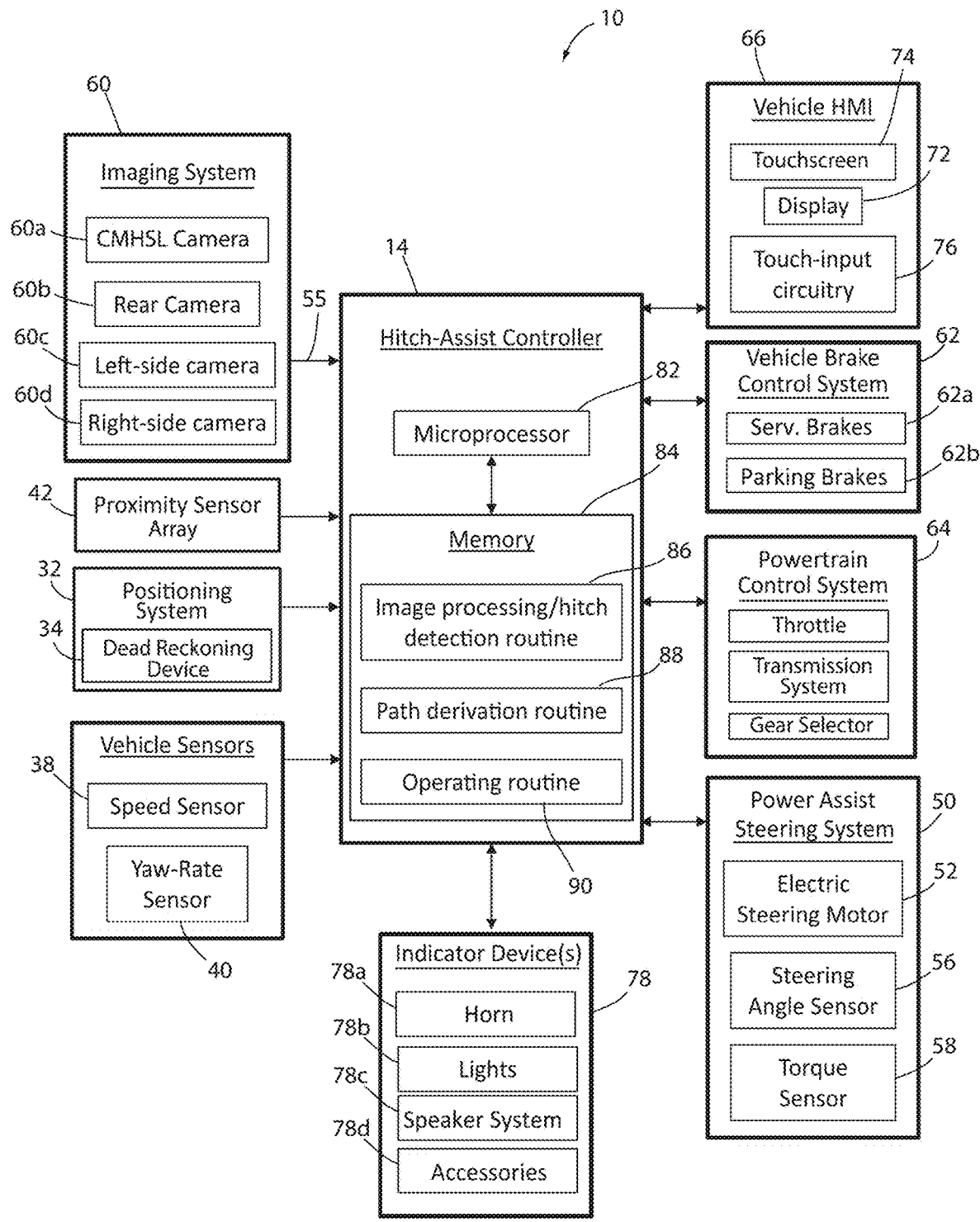
FIG. 2 is a diagram of a system according to an aspect of the disclosure for assisting in aligning the vehicle with a trailer in a position for hitching the trailer to the vehicle.
Figure 3:
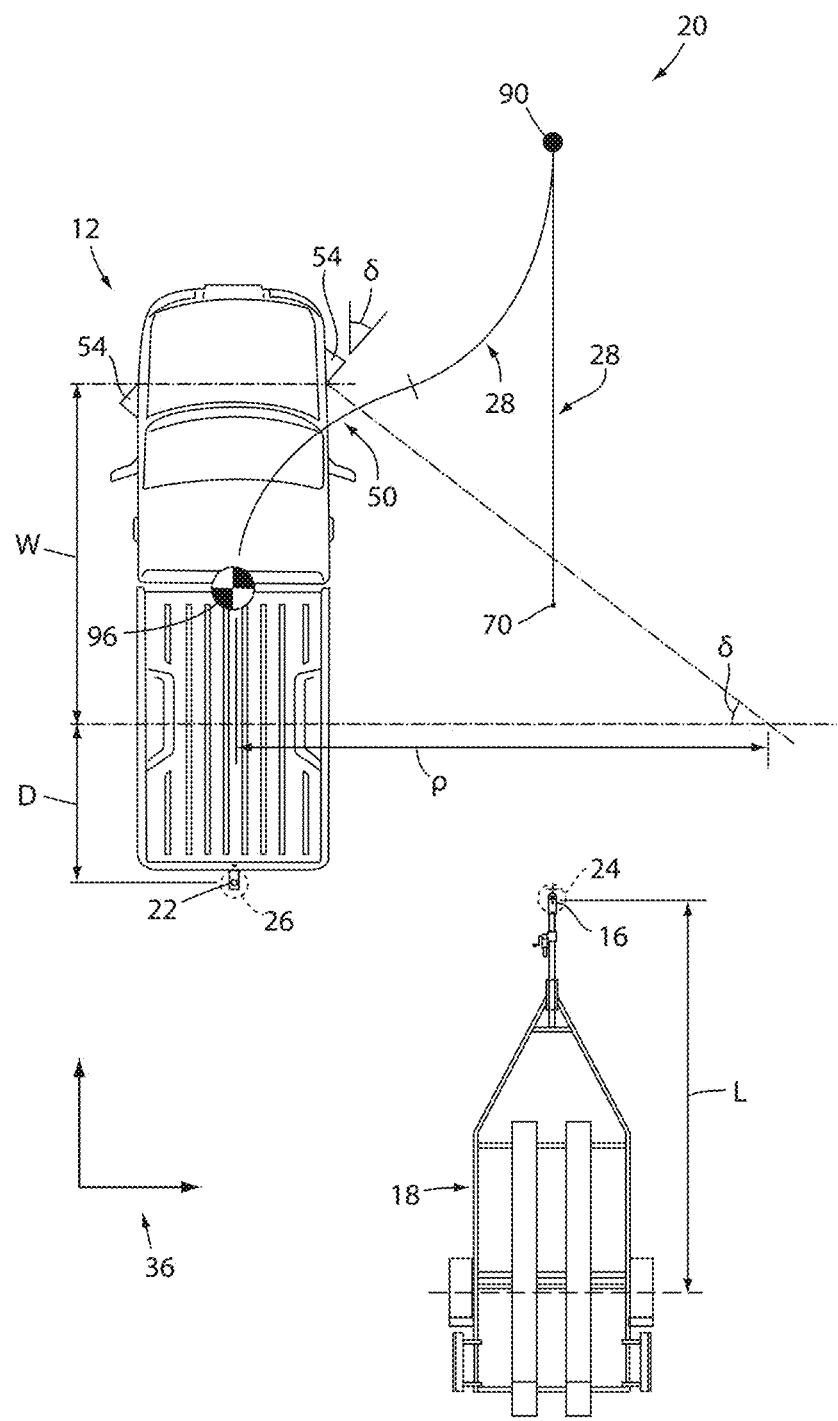
FIG. 3 is an overhead schematic view of a vehicle during a step of the alignment sequence with the trailer.
Figure 4:
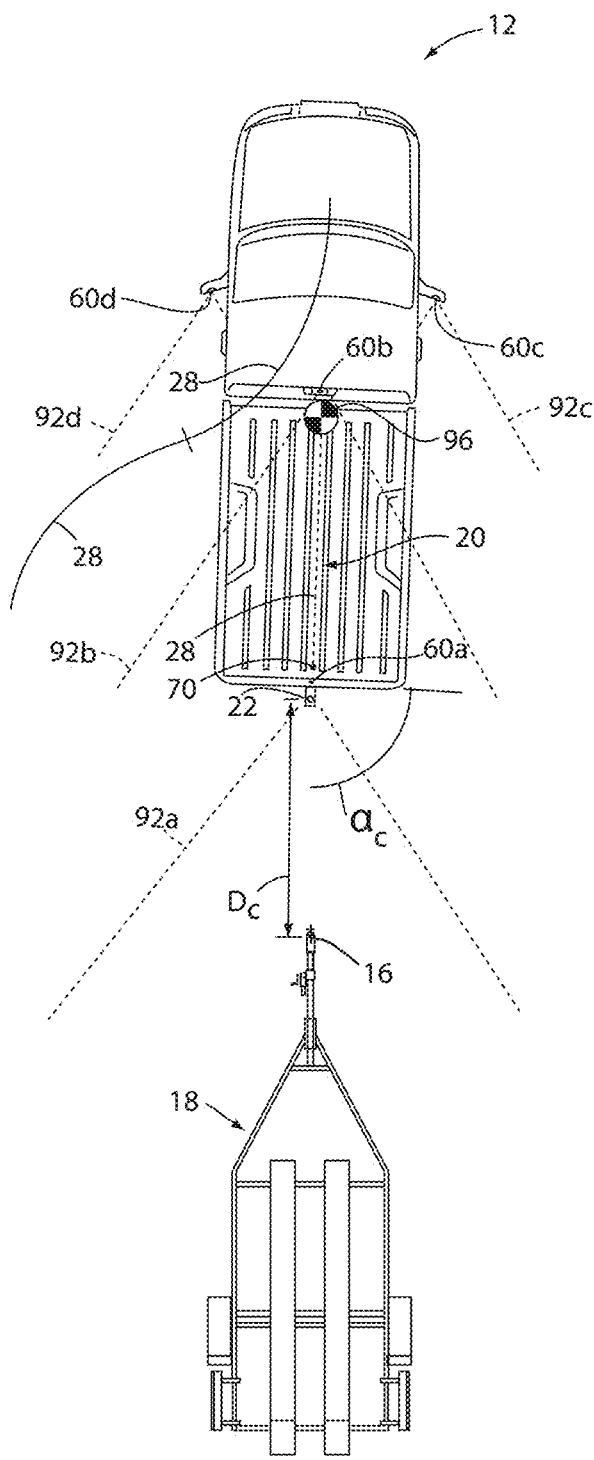
FIG. 4 is a is an overhead schematic view of a vehicle during a step of the alignment sequence with the trailer.

With respect to the general operation of the hitch assist system 10, as illustrated in the system diagram of FIGS. 2-4, the hitch assist system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle S. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent collision with trailer 18.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

Hitch assist system 10 may also incorporate the imaging system 60 that includes one or more exterior cameras 60a-60d. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras 60a-60d can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22a (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22a and coupler 16 of trailer 18. In the example shown, an initial position of vehicle 12 relative to trailer 18 may be such that coupler 16 is only in the field of view 92c of side-view camera 60c, with vehicle 12 being positioned laterally from trailer 18 but with coupler 16 being almost longitudinally aligned with hitch ball 22a. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22a. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information can then be used in light of the position 24 of coupler 16 within the field of view 92c of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22a with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22a with coupler 16. In particular, controller 14 can have stored in memory 84 various characteristics of vehicle 12, including the wheelbase W, the distance from the rear axle to the hitch ball 22a, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 88 can be programmed to derive vehicle path 20 to align a known location of the vehicle hitch ball 22a with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22a, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22a with coupler 16.

As discussed above, hitch assist system 10 can provide image data to image processing routine 86 that can be used by image processing routine 86 (by the process described above or by other available processes) to determine the height $H_b$ of hitch ball 22a (i.e., a vertical component of the data including the position 24 of coupler 16. The image data may be captured by one or more of the cameras 60a-60d of the imaging system 60. Further, hitch assist system 10 can have stored in memory 84 or can otherwise determine the height $H_b$ of hitch ball 22a. In one example, during an initial setup routine for hitch assist system 10, a user U can be prompted to install hitch ball 22a by way of assembling a ball mount including hitch ball 22a with a receiver positioned on the rear of vehicle 12. The user U can then be asked to measure the height $H_b$ of the hitch ball 22a (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22a may be within the field of view 92a of rear camera 60a such that image data can be processed to determine the height $H_b$ of hitch ball 22a on a real-time or on-demand basis.

Figure 5:
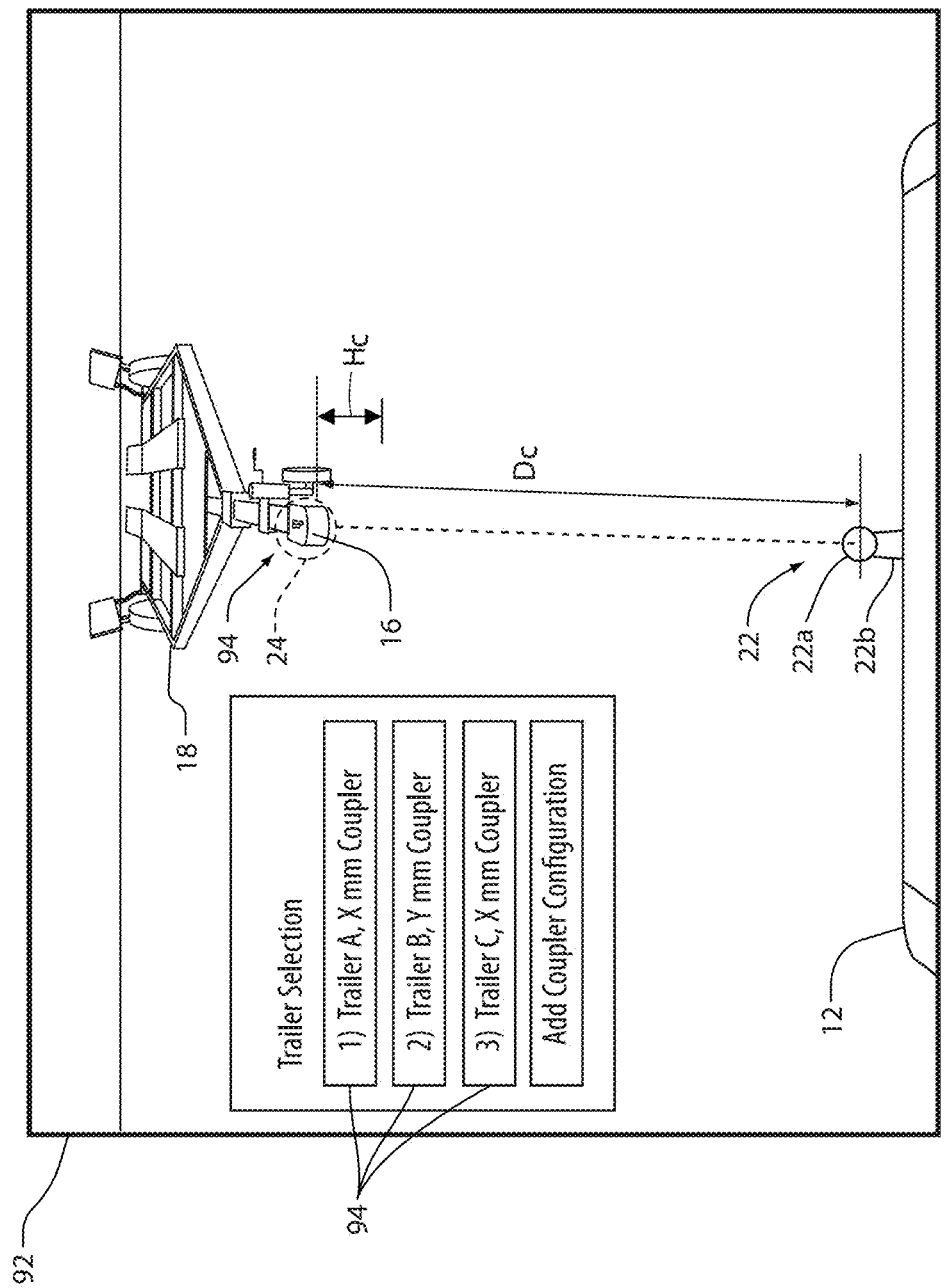
FIG. 5 is a is a projected view of image data demonstrating an alignment sequence with the trailer.
Figure 6A:
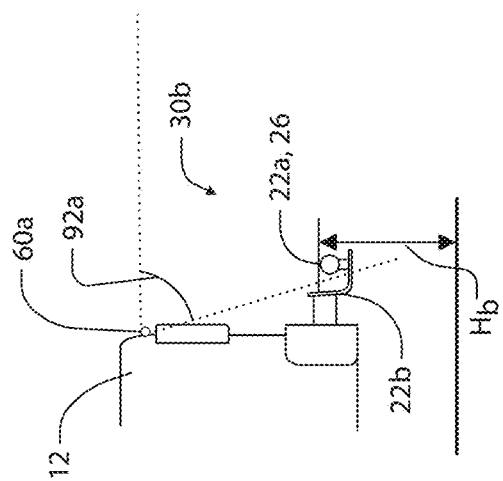
FIG. 6A is a side view of a vehicle demonstrating a hitch assembly monitored by a field of view of a camera of an imaging system.
Figure 6B:
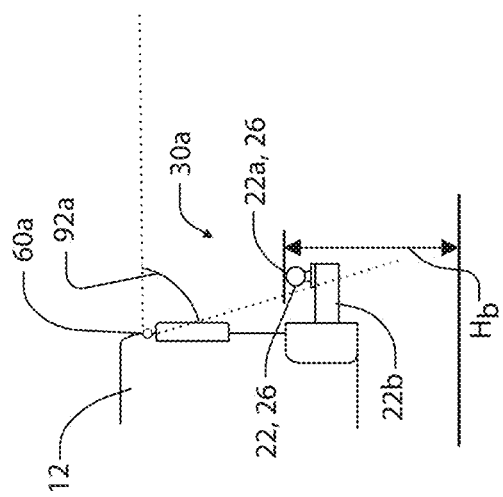
FIG. 6B is a side view of a vehicle demonstrating a hitch assembly monitored by a field of view of a camera of an imaging system.

Referring now to FIGS. 5, 6A, and 6B, as previously discussed, the hitch assist system 10 may be configured to detect and/or store a configuration of the hitch ball 22a in connection with the vehicle 12. In some embodiments, the system 10 may be configured to store a plurality of the configurations 30 of the hitch assemblies 22 identifying a diameter and connection configuration of the hitch ball 22a via the hitch adapter 22b or ball mount. The hitch assembly 22 may connect the hitch ball 22a to the vehicle in a variety of configurations. In operation, the user U of the system 10 may select the hitch ball 22a and the hitch adapter 22b via the HMI 66 further discussed in reference to FIGS. 7 and 8. Each of the combinations may result in variation in the hitch position 26 and/or the height $H_b$ of the hitch ball 22a. A first configuration 30a and a second configuration 30b of the hitch assembly 22 are demonstrated in FIGS. 6A and 6B, respectively.

As is discussed further in reference to various embodiments, the hitch assist system 10 may be configured to detect a height $H_c$ of the coupler 16 and control the navigation of the vehicle 12 along the vehicle path 20. During the control of the vehicle 12, the system 10 may identify whether the hitch ball 22a is compatible with the coupler 16. Additionally, the system 10 may determine whether the height $H_b$ of the hitch ball 22a is compatible with (e.g., below or less than) the height $H_c$ of the coupler 16. In an exemplary embodiment, the controller 14 of the hitch assist system 10 may be configured to detect and/or store the dimensions and the compatibility of each of a plurality of hitch assemblies 22 to a variety of trailers in order to improve an ease of use and accuracy of the system 10. In some embodiments, the hitch assist system 10 may further be configured to detect a connection configuration of the coupler 16 of the trailer 18.

Referring to FIG. 5, the controller 14 may be configured to process the image data received from the imaging system 60 and display one or more of the fields of view 92 on the display 72 of the vehicle 12. Based on the image data received from the imaging system 60, the controller 14 may be configured to identify the position 24 of the coupler 16 as well as the connection configuration 94 of the trailer 18. As demonstrated, in response to the activation of the trailer connection routine, the controller 14 may present a plurality of connection configurations 94 for the trailer 18 on the HMI 66. Accordingly, the connection configurations 94 for the trailer 18 may be detected or identified by the image processing routine 86 based on stored or otherwise known visual characteristics of coupler 16, the trailer 18, or hitches in general.

Referring now to FIGS. 6A, 6B, 7, and 8 the trailer connection routine may continue to detect or prompt the user U to identify the configuration 30 of the hitch assembly 22. As shown in FIGS. 6A and 6B, the imaging system 60 may be configured to detect the hitch ball 22a in a plurality of configurations 30, which may include a first configuration 30a and a second configuration 30b. In the first configuration 30a, the height $H_b$ of the hitch ball 22a may be greater that the height $H_b$ in the second configuration 30b. Additionally, the diameter of the hitch ball 22a and the hitch position 26 may vary in each of the configurations 30. Identifying such differences in the configurations 30 may be important to ensure that the hitch assist system 10 may accurately determine the height $H_b$ of the hitch ball 22a and the compatibility between the hitch ball 22a and the trailer 18.

The disclosure provides for the controller 14 to detect the configuration 30 via the image processing routine 86 and/or prompt the user U to identify the configuration 30 on the HMI 66. Based on the configuration 30 of the hitch assembly 22 as well as the connection configuration 94 of the trailer 18, the controller 14 may identify the height $H_b$ and position of the hitch ball 22a as well as the compatibility of the hitch ball 22a with the trailer 18. Accordingly, the controller 14 may be configured to identify a compatibility of the hitch ball 22a with the trailer 18 and adjust a location of the hitch ball 22a to maintain accuracy of the path derivation routine 88. Though the disclosure is discussed in reference to specific embodiments depicted in the accompanying figures, the system 10 may be implemented to suit a variety of applications without departing from the spirit of the disclosure.

Figure 7:
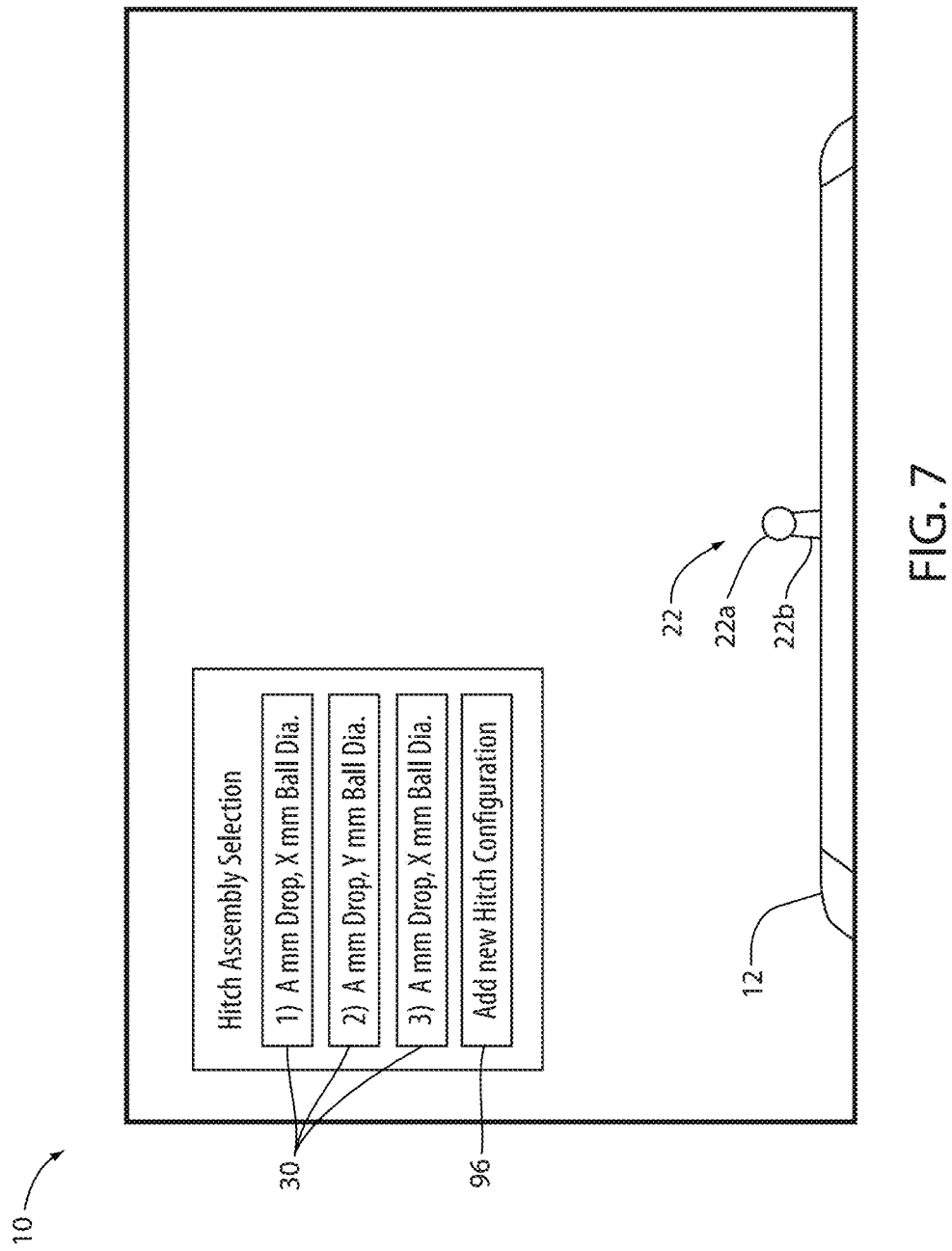
FIG. 7 is a projected view of image data displayed on a user interface demonstrating a hitch selection routine.

As shown in FIG. 7, the display 72 of the HMI 66 is shown demonstrating a manual selection for the configuration 30 of the hitch assembly 22. As illustrated, the plurality of configurations 30 are shown on the display 72 prompting the user U to identify the current configuration. Each of the configurations 30 may be stored in the memory 84 after an initial setup. For example, upon initial setup for each of the configurations 30, the controller 14 may prompt the user U to enter the details of the configuration via an add configuration option 96. In this way, the hitch assist system 10 may be configured to prompt the user U to make a selection identifying the hitch assembly 22 or the dimensions of the hitch assembly in response to the initialization of the hitch assist routine.

As demonstrated, each of the configurations 30 of the hitch assembly 22 may comprise an identification of the hitch adapter 22b as well as the hitch ball 22a. In this way, the controller 14 may identify changes in the configuration 30 of the hitch assembly 22 and compare the configuration 30 to the connection configuration 94 of the trailer 18. For example, the controller may compare the size of the hitch ball 22a to the size of the coupler 16 to ensure that the sizes are compatible. Each of the connection configurations 94 may comprise a name or identifier for the trailer 18 as well as information regarding the diameter of the coupler 16. In this way, the controller 14 may compare the size of the hitch ball 22a with the connection configuration 94 of the trailer 18 to identify the compatibility of the coupler 16 of the trailer 18 with the hitch assembly 22.

Figure 8:
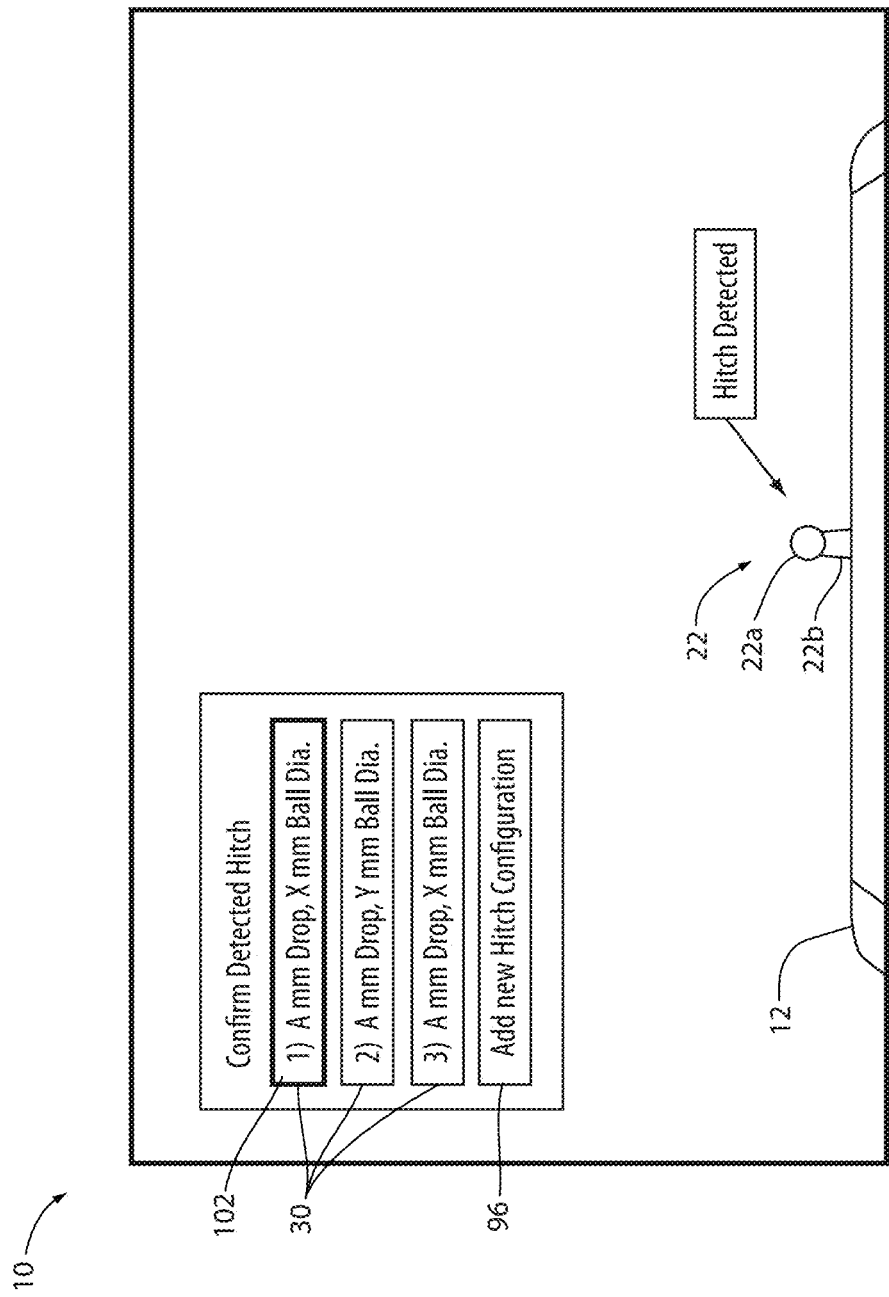
FIG. 8 is a projected view of image data displayed on a user interface demonstrating a hitch detection routine.

Referring now to FIG. 8, in some embodiments, the controller 14 may be configured to detect the configuration 30 of the hitch assembly 22. For example, upon initiation of hitch assist system 10, such as by user input on touchscreen 74 of the HMI 66, the image processing routine 86 may identify the configuration 30 of the hitch assembly 22 in the image data in the first field of view 92a of the camera 60a. As previously discussed, based on the image data, the controller 14 may identify the relative hitch position 26 and proportions of the hitch ball 22a in the field of view 92a. In this way, the controller 14 may automatically identify the configuration 30 of the hitch assembly 22 and display the configuration 30 on the display 72 of the HMI 66.

Once the configuration 30 of the hitch assembly 22 is identified, the controller 14 may further prompt the user U to verify the configuration 30. As demonstrated in FIG. 8, the controller 14 may display each of a plurality of configurations 30 and highlight a detected configuration 102 for selection or confirmation by the user U. Once the selection or detection of the configuration 30 of the hitch assembly 22 is complete, the controller 14 may initiate the path derivation routine 88 and the operating routine 90. In this way, the controller 14 may ensure that the operation of the hitch assist system 10 is user friendly and intuitive.

Figure 9:
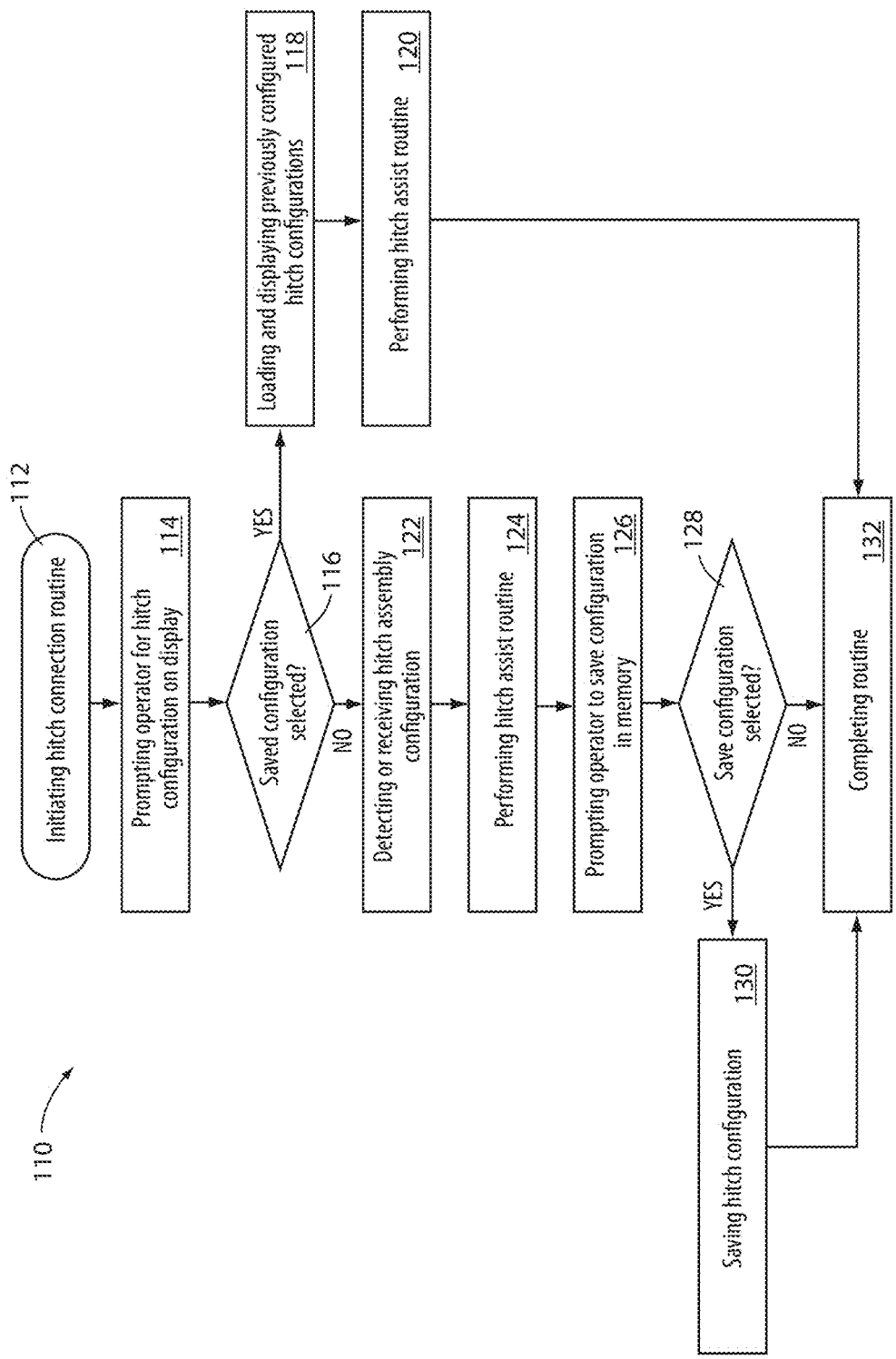
FIG. 9 is a flow chart demonstrating a method for programming or selecting a hitch configuration for a vehicle in accordance with the disclosure.

Referring now to FIG. 9, a flow chart demonstrating a method 110 for the selection of the configuration 30 for the hitch assembly 22 is shown. In operation, the method 110 begins in response to the initialization of a hitch connection routine, which may be selected by the user U via the HMI 66 (112). The method 110 may continue by prompting the user U to select a hitch configuration on the display 72 (114). The controller 14 may then prompt the user U to identify whether the hitch assembly 22 is a saved configuration or a new configuration as described in decision step 116. In response to the user identifying that the configuration 30 was previously saved, the controller 14 may continue to step 118 prompting the user U to select the configuration 30 for the hitch assembly 22 on the HMI 66. In response to receiving a selection of the configuration 30, the controller 14 may continue to perform the hitch assist routine by processing the path derivation routine 88 and the operating routine 90 (120).

If a new configuration (e.g., the add configuration option 96) is selected in step 116, the controller 14 may then continue to detect or receive the configuration 30 of the hitch assembly 22 (122). As previously discussed, the controller 14 may detect the configuration 30 of the hitch assembly 22 via the image processing routine 86 by processing the image data in the first field of view 92a of the camera 60a. Additionally, the controller 14 may be configured to receive an input from the user U identifying the configuration 30 of the hitch assembly 22 via the HMI 66 in step 122. Once identified, the controller 14 may utilize the configuration 30 of the hitch assembly 22 to perform the hitch assist routine (124). In this way, the controller 14 may be configured to process and complete the path derivation routine 88 and the operating routine 90 for various configurations of the hitch assembly 22 and the coupler 16 of the trailer 18.

Following the completion of the hitch assist routine in step 124, the controller 14 may prompt the user U via the HMI to specify whether or not to save the new configuration from step 122 (126). The controller 14 may then determine if the user U decides to save the new configuration based on an input received by the HMI 66 (128). If the new configuration is saved in step 128, the controller 14 may save the new configuration to the memory 84 (130). Following steps 128 and 130, the method 110 may continue by completing the hitch assist routine in step 132. Accordingly, the system 10 may provide for improved ease of operation of the vehicle 12 in detecting the hitch assembly 22 and connecting the vehicle 12 to the trailer 18.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for identifying a trailer connection for a vehicle, the method comprising:
    storing a plurality of connection configurations as saved configurations, wherein the connection configurations identify a compatibility of a coupler of a trailer to a hitch assembly;
    identifying a hitch configuration of the hitch assembly as a first hitch configuration of the saved configurations, wherein the first hitch configuration comprises a hitch ball diameter of a hitch ball of the hitch assembly;
    capturing first image data depicting the trailer;
    processing the first image data and identifying a detected coupler configuration of the coupler of the trailer as a second configuration of the saved configurations;
    comparing the first configuration of the hitch assembly to the second configuration of the coupler;
    identifying the compatibility of the coupler to the hitch ball diameter of the hitch assembly based on the comparison; and
    controlling a navigation operation of the vehicle based on the first hitch configuration of the hitch assembly in response to the compatibility.

2. The method according to claim 1, further comprising:
    receiving a confirmation of the first hitch configuration via a user interface.

3. The method according to claim 1, further comprising:
    displaying the first hitch configuration on a display identifying the detected hitch configuration.

4. The method according to claim 1, further comprising:
    identifying a location of a coupler of a trailer in first image data; and
    controlling a navigation of the vehicle based on the first hitch configuration of the hitch assembly and the location of the coupler.

5. The method according to claim 1, wherein the saved configurations comprise a position of the hitch ball relative to the vehicle.

6. The method according to claim 5, further comprising:
    processing a path derivation routine identifying a navigation path of the vehicle aligning the hitch ball with the coupler based on the position of the hitch ball.

7. The method according to claim 1, wherein the coupler configuration comprises a connection diameter of the coupler.

8. A vehicle system, comprising:
    a hitch assembly mounted on a vehicle;
    an imaging system configured to capture image data comprising the hitch assembly;
    a user interface comprising a display; and
    a controller that:
        identifies a coupler of a trailer based on the image data;
        accesses a coupler configuration of the trailer in response to the identification of the trailer;
        identifies a compatibility of the coupler configuration to a hitch ball diameter of the hitch assembly based on the coupler configuration; and
    controls an automated navigation operation of the vehicle based on the configuration for the hitch assembly.

9. The system according to claim 8, wherein the controller further:
    identifies the hitch assembly based on the image data;
    accesses a hitch configuration of the hitch assembly in response to the identification displays the hitch configuration on the display; and
    receives a selection of the hitch configuration.

10. The system according to claim 9, wherein the controller further:
    displays the coupler configuration on the display; and
    receives a selection of the coupler configuration.

11. The system according to claim 10, wherein the selection of the coupler configuration is a confirmation that the detected coupler is correctly identified.

12. The system according to claim 8, wherein the controller further:

in response to a positive determination of the connection compatibility, controls the automated navigation operation.

13. The system according to claim 8, wherein the controller further:
in response to a negative determination of the connection compatibility, outputs an instruction to adjust at least one of the hitch configuration and the coupler configuration.

14. A method for identifying a trailer connection for a vehicle, the method comprising:
storing a plurality of connection configurations as saved configurations, wherein the connection configurations identify a hitch compatibility of a coupler of a trailer to a hitch assembly;
capturing first image data of the hitch assembly;
processing the first image data and identifying a detected hitch configuration of the hitch assembly as a first hitch configuration of the saved configurations, wherein the first hitch configuration comprises a hitch ball diameter of a hitch ball of the hitch assembly;
capturing second image data of the trailer;
processing the second image data and identifying a detected trailer configuration of a coupler of the trailer as a second configuration of the saved configurations;
comparing the first configuration of the hitch assembly to the second configuration of the coupler;
identifying a compatibility of the coupler to the hitch ball diameter of the hitch assembly based on the comparison; and
controlling a navigation operation of the vehicle based on the compatibility.

15. The method according to claim 1, further comprising:
capturing second image data depicting the hitch assembly;
processing the second image data and identifying the hitch configuration of the hitch assembly as the first hitch configuration of the saved configurations.

16. The system according to claim 9, wherein the selection of the hitch configuration is a confirmation that the detected hitch assembly is correctly identified.

* * * * *